United States Patent [19]

Squiers et al.

[11] 4,075,674
[45] Feb. 21, 1978

[54] EXPANDABLE ELECTRONIC PROTECTION SYSTEM

[75] Inventors: David J. Squiers, Attleboro Falls; Robert E. Obenhaus, South Easton, both of Mass.

[73] Assignee: Texas Instruments Incorporated, Dallas, Tex.

[21] Appl. No.: 637,912

[22] Filed: Dec. 5, 1975

Related U.S. Application Data

[63] Continuation of Ser. No. 316,194, Dec. 18, 1972, abandoned.

[51] Int. Cl.² .............................................. H02H 5/04
[52] U.S. Cl. ...................................... 361/27; 361/106
[58] Field of Search .................... 317/13 C, 13 R, 41, 317/14 J; 361/27, 25, 37, 106

[56] References Cited

U.S. PATENT DOCUMENTS

| 3,457,460 | 7/1969 | Buiting et al. | 317/13 C |
| 3,500,074 | 3/1970 | Obenhaus | 317/41 X |

*Primary Examiner*—Harry E. Moose, Jr.
*Attorney, Agent, or Firm*—John A. Haug; James P. McAndrews

[57] ABSTRACT

The disclosure relates to a protection system for electric motors and the like wherein a plurality of condition responsive PTC impedances are utilized in a bridge circuit to sense predetermined changes in the condition being sensed and proceed to interrupt current flow to a motor or the like being protected. The protection circuit is capable of sensing short circuits or impedances below a predetermined minimum across the sensors to thereby provide an alarm condition also. On the occurrence of the alarm condition, a lockout circuit is energized to prevent application of power to the motor, etc. until after power has been removed from the entire electric circuit and then reapplied thereto. The protection circuit of the present disclosure is also capable of either automatic or manual reset. There is also provided a pop-up flag and remote overload light which can be operated upon sensing of an alarm condition. The pop-up flag is designed to remain in the alarm condition even after removal of the alarm condition and later proper operation when operation is in the manual reset mode.

4 Claims, 4 Drawing Figures

EXPANDABLE ELECTRONIC PROTECTION SYSTEM

This is a continuation of application Ser. No. 316,194, filed Dec. 18, 1972, now abandoned.

This invention relates to an expandable electronic protection system for protection of motors and other such devices, and, more particularly, to a protection circuit capable of sensing an alarm condition with high tolerance and no calibration and capable of automatically removing the power from the protected device with a lockout function until removal and reset or reapplication of power to the protection circuit.

Protection systems using PTC components which are capable of providing good protection with high tolerance and which requires a calibration of the sensor elements of the circuit is known in the prior art. Such a prior art circuit is fully set forth in the application of R. W. Strachan, Ser. No. 243,328, filed Apr. 16, 1972 which issued on June 19, 1973 as U.S. Pat. No. 3,740,613. While protective systems of this type have found a great deal of utility and have been highly successful in certain applications, they have been incapable of determining when a short circuit or impedance below a predetermined level appears across the sensor elements. The above prior art circuit also provides for the automatic reapplication of power after the breakoff of power. This will occur whenever the condition causing the alarm has been removed. The above prior art protection circuit also does not disclose the capability of manual reset of protection against an essentially short circuit condition at the input.

In accordance with the present invention, the above shortcomings of the prior art protection system are overcome and there is provided a protection system capable of sensing alarm conditions on any one of plural devices as well as a low impedance or short circuit condition at any one of the sensors. In accordance with the present invention there is also provided a lock-out circuit which prevents operation or application of power to the device being protected until power from the circuit has been removed and reapplied. The circuit also includes a manual reset whereby the operator must physically operate a button before power will be transferred to the protected device.

Briefly, the above is provided by utilizing a protection circuit of the type described in the above-mentioned co-pending application, said circuit further including a further bridge circuit including the sensors whereby an unbalanced condition on the low side as well as the high impedance alarm condition will prevent firing of an SCR, thereby causing a capacitor which normally discharges through the SCR to charge-up to a predetermined voltage and break-down a zener diode, the current from the capacitor maintaining the protection circuit off until power has been removed from the protected circuit. At this point, the charge on the capacitor quickly bleeds off, thereby removing the voltage level provided by said capacitor through the zener diode. When the line voltage is again applied to the protected circuit, it will proceed to function in its normal manner and provide power or allow power to be provided to the protected circuit.

It is therefore an object of this invention to provide an electronic protection circuit which is capable of sensing alarm conditions which provide both a high impedance at the sensor as well as a low impedance below some predetermined value.

It is a further object of this invention to provide a protection circuit capable of inhibiting the application of power to the protected device after an alarm condition until the removal and reapplication of power to the protection circuit.

It is a further object of this invention to provide an alarm indicator responsive to an alarm condition which stays in its alarm state after removal of the alarm condition and later normal operation of the protection circuit except by manual resetting thereof.

It is a yet further object of this invention to provide a protection circuit capable of operating with one of either manual or automatic reset after indication of an alarm condition.

The above objects and still further objects of the invention will immediately become apparent to those skilled in the art after consideration of the following preferred embodiments thereof, which are provided by way of example and not by way of limitation, wherein.

Figure 1:
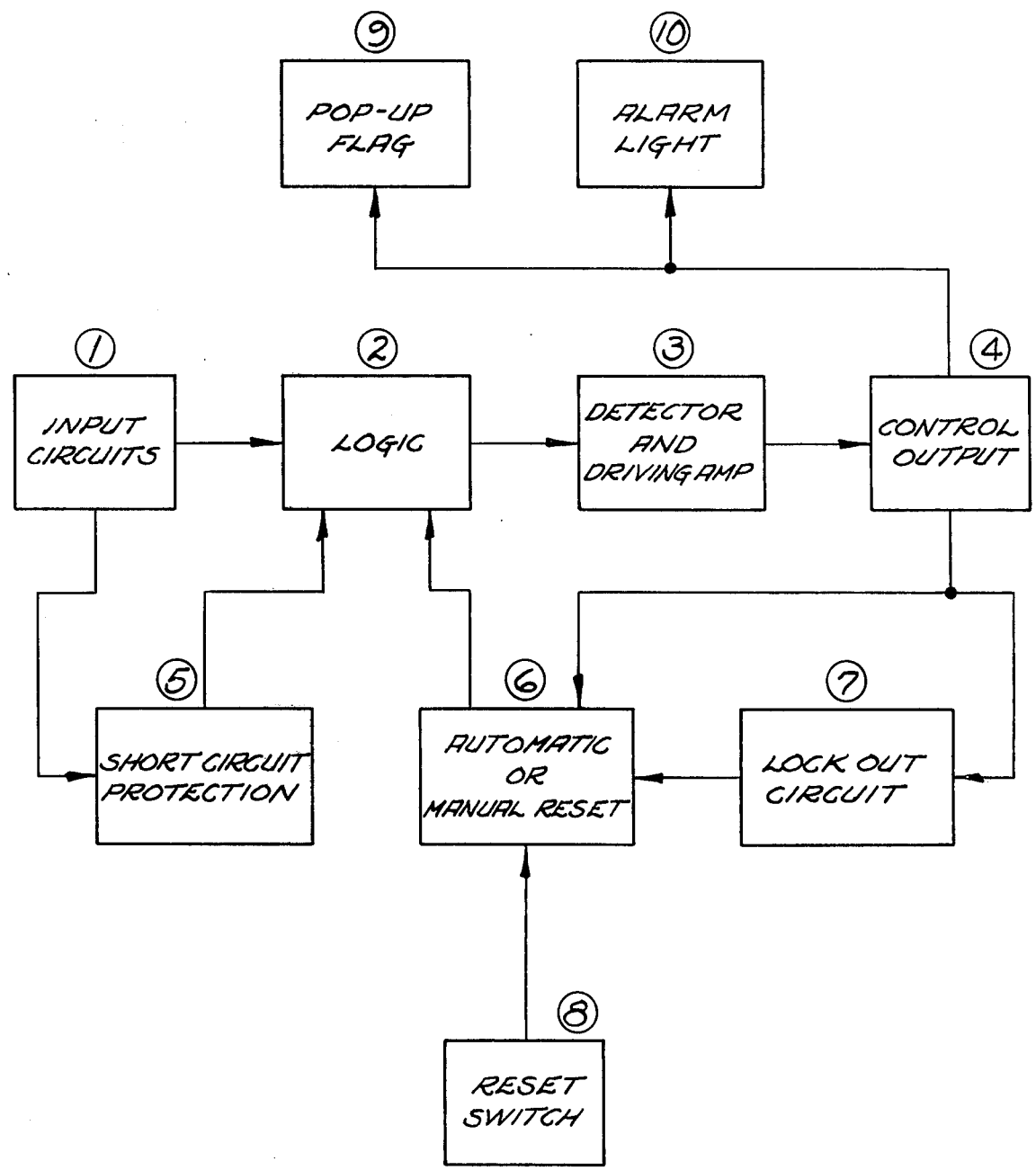
FIG. 1 is a block diagram of a protection circuit in accordance with the present invention.

Referring first to FIG. 1, there is shown the block diagram of the protection circuit of the present invention. The block diagram includes input circuits 1 which includes the sensors and the associated bridge circuitry for sensing high impedance changes in a sensor resistance. The input circuits can include plural different sensors of different types connected in parallel, any one of which can provide an alarm condition signal to the logic circuit 2. The logic circuit is a pair of three input gates which provides an output signal to the detector and driving amplifier 3 when any one of the sensors in the input circuits 1 provides an alarm indication. The detector and driving amplifier 3 provides a signal to the control output circuit 4 only when there is an alarm condition. Otherwise, the control output circuit functions in its normal manner to allow power to be applied to the protected device. When an alarm condition is sensed at the detector and driving amplifier 3, the control output 4 precludes power from the protected device and also causes operation of a lock-out circuit 7 which prevents reset or application of further power to the protected device until power has been removed from the protection circuit and then reapplied. This is accomplished by operation of the reset switch 8. In a second embodiment, with automatic reset in this case, operation of the alarm circuitry will place a resistor in the feed-back loop to control the differential between the trip and reset levels of the circuit. In this case, the reset switch 8 is not required. The circuit further includes a short circuit protection 5 which is a bridge operated in conjunction with the sensors of the input circuit 1 and, in the event of the sensing of a short circuit or an impedance below a predetermined level from one of the sensors, a signal is provided to the logic circuitry 2 to provide an alarm condition in the same manner as previously described.

Figure 2:
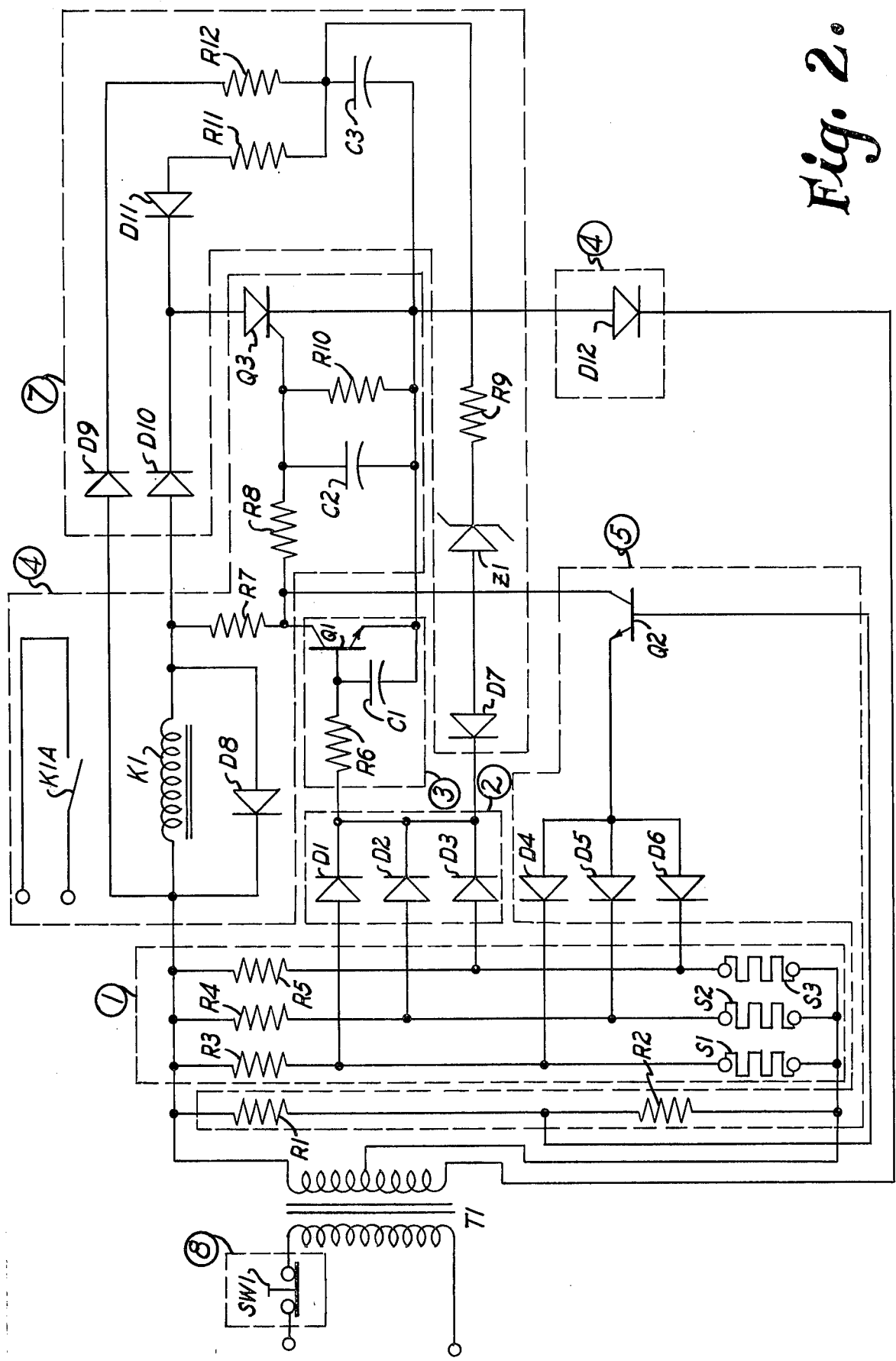
FIG. 2 is a circuit diagram of one embodiment of the protection circuit of FIG. 1.

Referring now to FIG. 2, there is shown a circuit diagram in accordance with the present invention utilizing manual reset. The circuitry corresponding to the blocks in FIG. 1 has been shown in dotted lines with corresponding character references. The circuit of FIG. 2 functions in the following manner. The center-tapped secondary of transformer T1 forms one-half of an a.c. bridge and works in conjunction with voltage dividers R3-S1, R4-S2 and R5-S3, each of which forms a separate second half of the bridge. The individual bridge circuits are brought into unbalance by the actions of the sensors S1-S3 whose resistance values vary as a function of some external parameter which is being measured. The sensors S1-S3 are PTC type materials of the type which will be explained in more detail hereinbelow.

A detector-amplifier 3 is connected across the bridge circuits between the center tap of transformer T1 and the mid points of the resistors R3 to R5 and their respective sensors S1 to S3. This detector-amplifier 3 comprises transistor Q1, resistor R6 and capacitor C1. The latter component provides stability to transistor Q1 to prevent oscillation. Logic 2 for the three channels shown in provided by diodes D1, D2 and D3 which prevents interaction between the three parallel voltage dividers. Transistor Q1 will conduct any time its base-emitter junction is forward biased and this occurs whenever the voltage across any sensor S1 through S3 increases above or decreases below a predetermined level determined by the constants of the circuit. This action causes the voltage at the junction between resistor R7 and resistor R8 to closely approach the value appearing at the cathode of the SCR Q3, thus greatly reducing the gate potential thereof. In all instances, the circuit is operating only on the positive half cycles as measured from the top of the transformer secondary with respect to its lower end.

The control output 4 comprises SCR Q3, relay K1, and K1A, diodes D8 and D12, resistors R7, R8 and R10 and capacitor C2. Power is applied to the relay K1 by action of the SCR Q3 which controls current to the upper half of the transformer secondary. Diode D8 is a free-wheeling diode placed across the relay coil to permit half wave operation of a.c. relay K1. Diode D12 is series connected with the relay K1 and SCR Q3 to provide transient and reverse bias protection to the said SCR device.

In normal operation, the SCR Q3 is conducting as a result of gate current supplied through resistors R7 and R8. Resistor R10 is a relatively low value resistor which provides an essentially constant impedance to the amplifier Q1. Capacitor C2 improves the transient characteristics of the SCR gate circuit. The SCR Q3 ceases conduction whenever transistor Q1 conducts and by passes gate current conduction to the cathode of the SCR. The normally open contact K1A of relay K1 functions as the power circuit element to the external load which might be a contactor, solenoid, or the like.

Protection against short circuits across the sensors or impedance below a predetermined value across the sensors S1 to S3 is provided through transistor Q2 which functions as a second detector between the voltage divider channels containing the sensors S1 to S3 and a separate voltage divider circuit comprising resistors R1 and R2. This forms another bridge circuit using diode logic for isolation composed of diodes D4, D5 and D6 which independently controls the gate current to the SCR Q3 independently of the transistor Q1. Whenever the resistance of a sensor input S1 to S3 falls below a predetermined preset limit, transistor Q2 is caused to conduct by the bridge unbalance and shunts gate current away from the SCR Q3. The short circuit resistance level where this action occurs is determined by the ratio of R1 and R2 and can be varied over a moderately large span.

The circuit of FIG. 2 is for the manual reset mode and includes the reset switch SW1 in the primary side of the transformer T1. To prevent circuit oscillation and to guarantee positive system lockout on a trip or alarm condition, the components diodes D7, D9, D10, D11, zener diode Z1, resistors R9, R11, R12 and capacitor C3 which comprise the lockout circuit 7 come into play. On alarm condition or tripping, the SCR Q3 ceases conduction and blocks the transformer supply voltage. This voltage is rectified by diode D9 and applied to the RC circuit comprising resistor R12 and capacitor C3. This DC voltage level is fed back to the base of transistor Q1 via resistor R9, zener diode Z1 and diode D7 which holds the output in the off condition as long as input voltage is available to the transformer T1. Upon removal of the alarm condition, the output to the device under protection can be provided by reset of the protective circuit. This is provided by removing power at the primary of transformer T1 by opening the normally closed reset switch SW1, thereby allowing the charge on the capacitor C3 to quickly bleed off. The protective circuit will not reset if any input is above this trip level. Diode D11 and resistor R11 prevent voltage buildup on capacitor C3 during the time when the SCR Q3 is conducting. Diode D10 prevents discharge of capacitor C3 back through resistors R7, R8 and R10.

Figure 3:
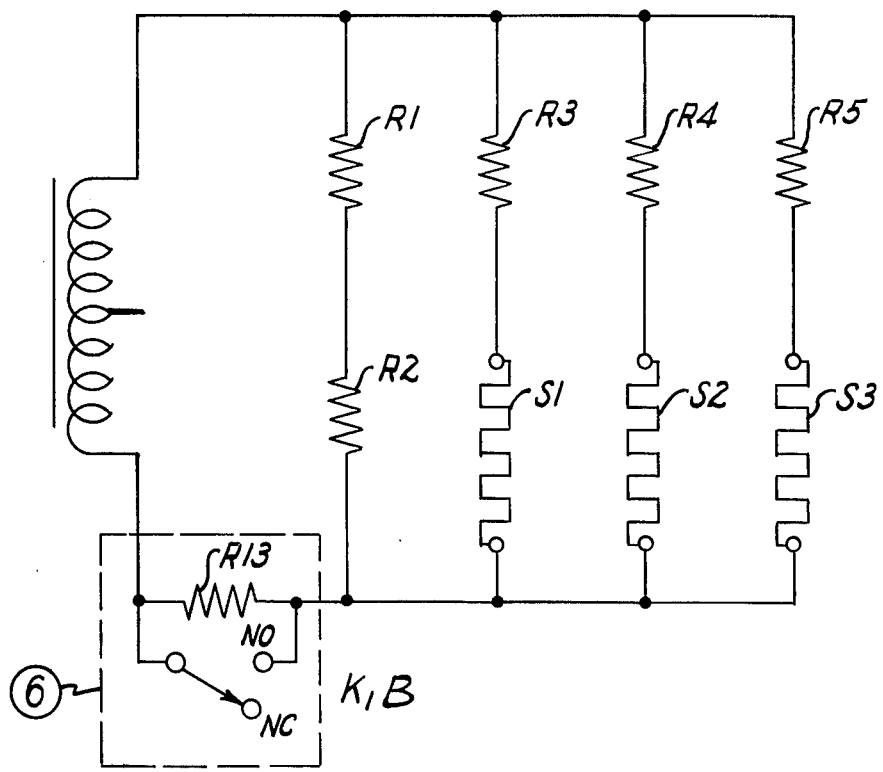
FIG. 3 is a circuit diagram of a portion of a second embodiment of a protection circuit according to the present invention.

Referring now to FIG. 3, there is shown a second embodiment of the invention wherein a resistor R13 is connected across the normally open contact of contact K1B which is operated by the relay K1. The contact K1B and resistor R13 are placed in the circuit of FIG. 2 between the junction of resistor R2 and sensors S1 to S3 and the lower part of the transformer secondary winding. In this embodiment, upon sensing of an alarm condition and cutting off of the SCR Q3, relay K1 will cause contact K1B to go to the normally closed position and place resistor R13 in series with the transformer secondary. This will provide voltage feedback to the protection circuit to guarantee non-chattering action on tripout or alarm condition. The value of resistor R13 also controls the differential between trip and reset levels for the protection circuit. In this embodiment, the reset switch SW1 is not required.

Figure 4:
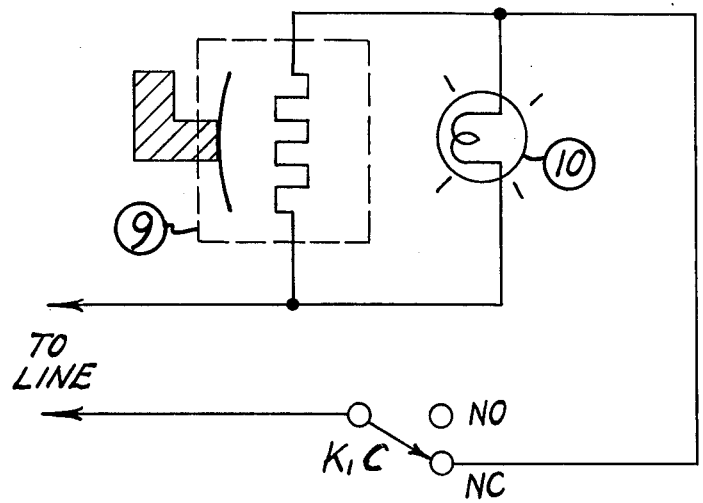
FIG. 4 is a third embodiment of a protection circuit in accordance with the present invention.

Referring now to FIG. 4, there is shown a further optional feature of the present invention. In accordance with FIG. 4, there is shown an input to the line which is connected across the primary of transformer T1. In series with this input is a contact K1C which is controlled by the relay K1. Contact K1C is in the normally closed position. In the event of an alarm and the operation of relay K1 to the deenergized state, the light 10 will be illuminated, possibly at a reload point and a pop-up flag, which is a heat operated indicator, spring biased to the alarm state but retained therein by a bimetallic actuator will be placed in the alarm state due to the heat therein and bending of the bimetallic element from its inhibiting position. The indicator 9 must then be manually reset even after removal of the alarm condition and reapplication of power to the protected device.

Referring now to the PTC sensor elements, these are well known materials, also known as steep slope PTC or positive temperature coefficient type devices. These materials have a relatively constant resistance for increase in temperature until a particular threshold temperature is reached whereupon at the anomaly temperature, the temperature coefficient of the material increases dramatically. The PTC sensors are usually formed from doped barium titanate, the anomalous behavior being caused by a change in the crystal structure of the doped barium titanate cermaic. The characteristic anomaly temperature and resultant temperature coefficient are determined by the chemical composition of the barium titanate. Resistance changes of the PTC devices in the steep slope region after the anomaly temperature has been reached fall in the range of 25 to 150% per degree centigrade.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:
1. A protection circuit which comprises,
 a. a source of power,
 b. a first switch means in series with said source of power,
 c. circuit means responsive to an alarm condition to open said first switch means, and
 d. lockout means responsive to opening of said switch to maintain said switch open upon removal of said alarm condition, said circuit means includes a second switch means responsive to said alarm condition to open said first switch means and said lockout means includes means responsive to opening of said first switch means to close said second switch means.

2. A protection circuit as set forth in claim 1 further including means for closing said first switch means subsequent to an opening thereof.

3. A protection circuit as set forth in claim 2 wherein said means for closing said switch subsequent to opening thereof includes means for cutting off said source of power.

4. A protection circuit as set forth in claim 1 wherein said second switch means includes a normally nonconducting semiconductor, said lockout means locking said semiconductor into its conducting state upon sensing of said alarm condition.

* * * * *